(12) United States Patent
Jamison et al.

(10) Patent No.: US 10,919,781 B1
(45) Date of Patent: Feb. 16, 2021

(54) COATED POROUS SUBSTRATES FOR FRACKING WATER TREATMENT

(71) Applicant: Halliburton Energy Services, Inc., Houston, TX (US)

(72) Inventors: Dale E. Jamison, Humble, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/599,316

(22) Filed: Oct. 11, 2019

(51) Int. Cl.
| | | |
|---|---|---|
| *C02F 1/00* | (2006.01) | |
| *B01D 67/00* | (2006.01) | |
| *B01D 71/02* | (2006.01) | |
| *C02F 103/34* | (2006.01) | |

(52) U.S. Cl.
CPC .......... *C02F 1/004* (2013.01); *B01D 67/0088* (2013.01); *B01D 71/021* (2013.01); *B01D 71/024* (2013.01); *B01D 2239/1208* (2013.01); *B01D 2311/2603* (2013.01); *B01D 2311/2619* (2013.01); *B01D 2311/2634* (2013.01); *B01D 2311/2649* (2013.01); *B01D 2311/2676* (2013.01); *B01D 2311/2688* (2013.01); *B01D 2325/02* (2013.01); *B01D 2325/36* (2013.01); *C02F 2103/34* (2013.01)

(58) Field of Classification Search
None
See application file for complete search history.

(56) References Cited

U.S. PATENT DOCUMENTS

| | | | |
|---|---|---|---|
| 2,218,533 | A | 10/1940 | Huebotter |
| 3,533,480 | A | 10/1970 | Chenevert et al. |
| 4,872,991 | A | 10/1989 | Bartels et al. |
| 5,129,468 | A | 7/1992 | Parmenter |
| 5,258,123 | A | 11/1993 | Huang et al. |
| 7,491,336 | B2 | 2/2009 | Markham et al. |
| 7,497,954 | B2 * | 3/2009 | Ivan .................... B01D 17/047 210/703 |
| 7,608,186 | B2 | 10/2009 | Bansal et al. |

(Continued)

FOREIGN PATENT DOCUMENTS

| | | |
|---|---|---|
| JP | 2017159291 A | 9/2017 |
| KR | 101837230 B1 | 3/2018 |

(Continued)

OTHER PUBLICATIONS

Filing receipt and specification for patent application entitled "Graphene Oxide Coated Membranes to Increase the Density of Water Base Fluids," by Dale E. Jamison, et al., filed Oct. 11, 2019 as U.S. Appl. No. 16/599,308.

(Continued)

*Primary Examiner* — Chester T Barry
(74) *Attorney, Agent, or Firm* — Conley Rose, P.C.; Rodney B. Carroll (57) ABSTRACT

A method including contacting a stream including water with a coated porous substrate including a porous substrate coated with a hydrophilic and oleophobic coating to produce a treated water including water that passes through the coated porous substrate; and utilizing at least a portion of the treated water as a component of a hydraulic fracturing fluid.

21 Claims, 6 Drawing Sheets

(56) References Cited

U.S. PATENT DOCUMENTS

| | | | |
|---|---|---|---|
| 7,717,173 B2* | 5/2010 | Grott | C02F 1/42 |
| | | | 166/267 |
| 8,097,163 B1 | 1/2012 | Stewart et al. | |
| 8,505,743 B2* | 8/2013 | Sarkar | C09D 201/005 |
| | | | 210/490 |
| 10,092,882 B2* | 10/2018 | Yu | B01D 71/024 |
| 2005/0077243 A1* | 4/2005 | Pinnau | B01D 61/025 |
| | | | 210/652 |
| 2006/0008865 A1 | 1/2006 | Cote et al. | |
| 2008/0156709 A1 | 7/2008 | Johnson | |
| 2009/0107728 A1 | 4/2009 | Gaddis et al. | |
| 2010/0204066 A1 | 8/2010 | Ivan et al. | |
| 2013/0022754 A1* | 1/2013 | Bennett | B41C 1/1041 |
| | | | 427/532 |
| 2013/0098608 A1* | 4/2013 | Barnum | E21B 43/006 |
| | | | 166/263 |
| 2013/0146536 A1 | 6/2013 | Tarabara et al. | |
| 2013/0270188 A1* | 10/2013 | Karnik | G01N 15/082 |
| | | | 210/650 |
| 2014/0116948 A1* | 5/2014 | Meyer | E21B 43/26 |
| | | | 210/667 |
| 2015/0136712 A1 | 5/2015 | Carr | |
| 2016/0023167 A1* | 1/2016 | Deemer | C02F 1/44 |
| | | | 210/650 |
| 2016/0052814 A1* | 2/2016 | Leyendecker | C02F 9/00 |
| | | | 210/652 |
| 2016/0136537 A1* | 5/2016 | McGee | B01D 1/0035 |
| | | | 202/188 |
| 2016/0263494 A1 | 9/2016 | Mueller et al. | |
| 2017/0001890 A1* | 1/2017 | Milner | C02F 1/04 |
| 2017/0232402 A1 | 8/2017 | Xiao et al. | |
| 2018/0155602 A1 | 6/2018 | Zhang et al. | |
| 2018/0179858 A1* | 6/2018 | Fajt | A01N 37/34 |
| 2018/0185791 A1* | 7/2018 | Karnik | B01D 53/22 |
| 2018/0230024 A1* | 8/2018 | Glynn | B01D 61/022 |
| 2018/0250704 A1 | 9/2018 | Truica-Marasescu et al. | |
| 2018/0282191 A1* | 10/2018 | Lupton | C02F 3/345 |
| 2018/0333654 A1 | 11/2018 | Hugonin | |
| 2019/0001277 A1 | 1/2019 | Wolff | |
| 2019/0345046 A1* | 11/2019 | Daloia | C01F 11/462 |
| 2020/0299154 A1* | 9/2020 | Jennings | C02F 1/441 |

FOREIGN PATENT DOCUMENTS

| | | | |
|---|---|---|---|
| RU | 2012125859 A | | 1/2014 |
| WO | 8500532 A1 | | 2/1985 |
| WO | 2012158522 A2 | | 11/2012 |
| WO | 2018185746 A1 | | 10/2018 |

OTHER PUBLICATIONS

Acknowledgement receipt and specification for foreign application entitled "Graphene Oxide Coated Membranes to Increase the Density of Water Base Fluids," by Dale E. Jamison, et al., filed Oct. 15, 2019 as International application No. PCT/US2019/056308.

Filing receipt and specification for patent application entitled "Coated Porous Substrates for Oil and Gas or Chemical Processing Wastewater Treatment," by Dale E. Jamison, et al., filed Oct. 11, 2019 as U.S. Appl. No. 16/599,314.

Acknowledgement receipt and specification for foreign application entitled "Coated Porous Substrates for Oil and Gas Or Chemical Processing Wastewater Treatment," by Dale E. Jamison, et al., filed Oct. 15, 2019 as International application No. PCT/US2019/056310.

Acknowledgement receipt and specification for foreign application entitled "Coated Porous Substrates for Fracking Water Treatment," by Dale E. Jamison, et al., filed Oct. 15, 2019 as International application No. PCT/US2019/056311.

Foreign Communication from Related Application—International Search Report and Written Opinion of the International Searching Authority, International Application No. PCT/US2019/056311, dated Jul. 9, 2020, 11 pages.

Foreign Communication from Related Application—International Search report and Written Opinion of the International Searching Authority, International Application No. PCT/US2019/056310, dated Jul. 9, 2020, 10 pages.

Foreign Communication from Related Application—International Search Report and Written Opinion of the International Searching Authority, International Application No. PCT/US2019/056308, dated Jul. 7, 2020, 13 pages.

Office Action dated Sep. 25, 2020, from U.S. Appl. No. 16/893,763, filed Jun. 5, 2020, 33 pages.

* cited by examiner

FIG. 6B (12) United States Patent
US 10,919,781 B1

COATED POROUS SUBSTRATES FOR FRACKING WATER TREATMENT

TECHNICAL FIELD

The present disclosure relates generally to systems and methods for removing one or more contaminants from a contaminated aqueous stream associated with a hydraulic fracturing operation (e.g., fracking water) by contacting the contaminated aqueous stream with a coated porous substrate (for example, without limitation, a graphene oxide coated membrane) to provide a treated water.

BACKGROUND

During hydraulic fracturing operations, various contaminated aqueous fluids, such as contaminated hydraulic fracturing fluid, including water and one or more contaminants are produced. Managing such contaminated aqueous fluids can be challenging and expensive. As regulations become more and more restrictive, the level of contaminants (e.g., dissolved hydrocarbons, crosslinking agents, etc.) in a conventionally treated water may be too high to be discharged into the environment and/or efficiently reutilized.

Accordingly, there exists a need for a system and method of removing contaminants from contaminated aqueous fluids encountered during hydraulic fracturing operations, whereby a purity of the treated water can be reduced below a level needed for disposal and/or reutilization thereof. Desirably, the systems and methods enable recovery of potable water and/or the production of a reduced volume of waste material needing disposal.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The term "aqueous fluids" is utilized herein to refer to fluids including a base fluid selected from fresh water, seawater, saturated brine, formate brine, or a combination thereof, as well as to hydrocarbon based fluids including some amount of water. In embodiments, an aqueous fluid (e.g., a contaminated aqueous fluid in contaminated aqueous fluid line 15 described hereinbelow or a pretreated aqueous fluid in pretreated aqueous fluid line 15' described hereinbelow (e.g., with regard to FIG. 2)) includes greater than or equal to about 10, 20, 30, 40, 50, 60, 70, 80, 90, 91, 92, 93, 94, 95, 96, 97, 98, or 99 wt % water. In embodiments, an aqueous fluid (e.g., a contaminated aqueous fluid in contaminated aqueous fluid line 15 described hereinbelow or a pretreated aqueous fluid in pretreated aqueous fluid line 15' described hereinbelow (e.g., with regard to FIG. 2)) includes primarily (e.g., greater than or equal to about 50, 60, 70, 80, 90, 91, 92, 93, 94, 95, 96, 97, 98, or 99 wt % water).

As utilized herein, the term "hydrophilic" indicates "water attracting", i.e., having more thermodynamically favorable interactions with water than with oil or other hydrophobic solvents.

As utilized herein, the term "oleophobic" indicates "oil repelling", i.e., lacking an affinity to oil.

Herein disclosed are systems and methods for removing one or more contaminants from a contaminated aqueous fluid including water and one or more contaminants. The herein disclosed systems and methods provide for removing the one or more contaminants from the contaminated aqueous fluid by contacting the contaminated aqueous fluid with a coated porous substrate including a porous substrate coated with a hydrophilic and oleophobic coating. Via contact of the contaminated aqueous fluid with the coated porous substrate, water is removed from the contaminated aqueous fluid via passage through the coated porous substrate to provide a treated water including the water that passes through the coated porous substrate. A level of the one or more contaminants in the treated water is less than the level of the one or more contaminants in the contaminated aqueous stream. Accordingly, a "water purity" (e.g., a weight percent of water) of the treated water is greater than a water purity of the contaminated aqueous stream.

As detailed further hereinbelow, according to this disclosure, the contaminated aqueous fluid or stream can include a contaminated aqueous stream produced before, during, and/or after a hydraulic fracturing operation, and/or at least a portion of the treated water can be utilized as a component of a hydraulic fracturing fluid.

Figure 1A:
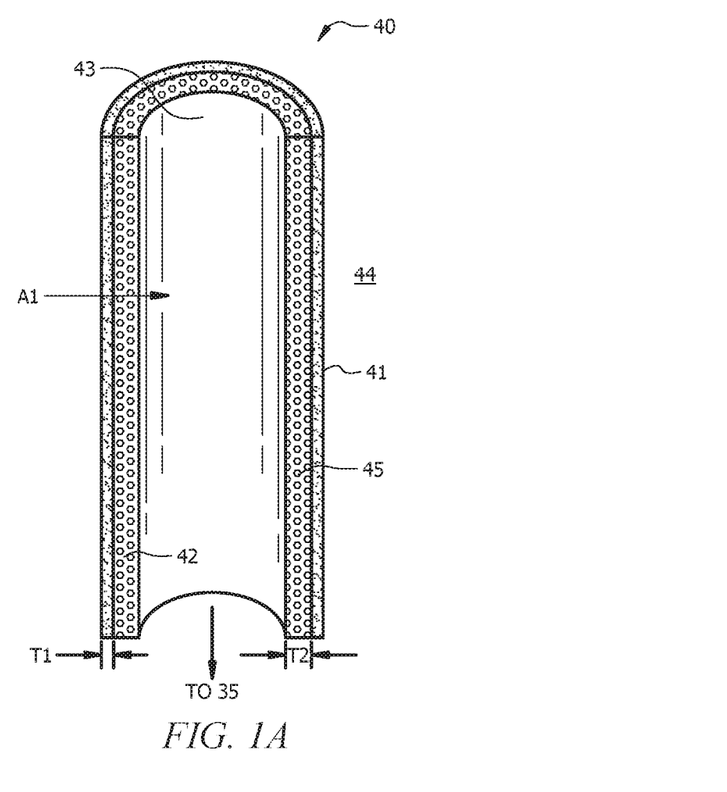
FIG. 1A is a schematic of a coated substrate, according to embodiments of this disclosure.

As detailed hereinbelow, coated substrates (e.g., graphene oxide coated membranes) can be used to remove contaminant(s) from contaminated aqueous streams. As depicted in FIG. 1A, which is a schematic of a coated porous substrate 40, according to embodiments of this disclosure, the coated porous substrate 40 includes a porous substrate 42 including pores 45 and coated by hydrophilic and oleophobic coating 41. The porous substrate 42 can be any suitable substrate which can be coated with the hydrophilic and oleophobic coating 41 and allow passage of water therethrough. In embodiments, the porous substrate 42 includes a support material. Although referred to as a "porous" substrate 42, a substrate of coated substrate 40 can be any permeable material (e.g., with or without "pores" 45) which can be coated with the hydrophilic and oleophobic coating 41 and allow passage of water therethrough. In embodiments, the porous substrate 42 includes a membrane, a particulate, a tube, or a combination thereof. In the embodiment of FIG. 1A, porous substrate 42 includes a cylindrical tube. In embodiments, porous substrate 42 includes a membrane shaped into a cylindrical tube, a flat membrane, or a membrane in another configuration. In embodiments, the porous substrate includes pores 45 having an average diameter of greater than or equal to about 0.5 nm, 1, 2, 3, 4, 5, 6, 7, 8, 9, 10, 20, 30, 40, or 50 nm, less than or equal to about 20, 10, 9, 8, 7, 6, 5, 4, 3, 2, or 1 μm, or in a range of from about 0.5 nm to about 20,000 nm, from about 5 nm to about 10,000 nm, or from about 50 nm to about 1,000 nm. In embodiments, the porous substrate includes a polymer, a ceramic, a zeolite, a molecular sieve, or a combination thereof.

As depicted in the embodiment of FIG. 1A, the hydrophilic and oleophobic coating of coated substrate 40 can have a thickness T1 in a range of from about 1 to about 100 nm, from about 1 to about 50 nm, or from about 1 to about 10 nm, less than or equal to about 100, 50, or 10 nm, and/or greater than or equal to about 1, 5, or 10 nm. Also as depicted in the embodiment of FIG. 1A, the porous substrate 42 of coated substrate 40 can have a thickness T2 in a range of from about 0.2 mm to about 100 mm, from about 1 mm to about 50 mm, or from about 10 mm to about 25 mm, less than or equal to about 100 mm, 50 mm, or 25 mm, and/or greater than or equal to about 0.2 mm, 1 mm, or 10 mm.

Figure 1B:
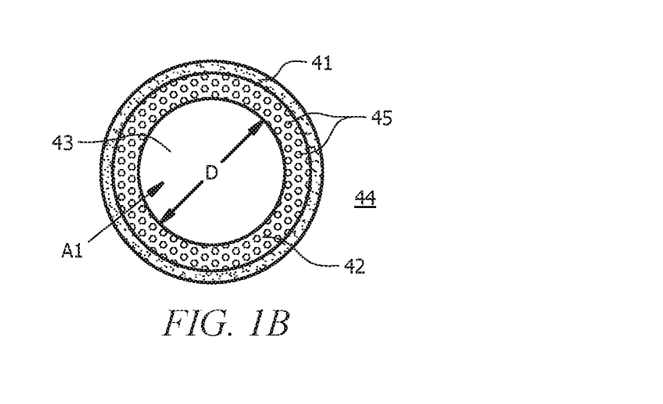
FIG. 1B is a cross section view of the coated substrate of FIG. 1A.

With reference to FIG. 1B, which is a cross section of the coated substrate 40 of FIG. 1A, in embodiments, coated substrate 40 (e.g., a cylindrical or spherical porous substrate 42) has an inner diameter in a range of from about 1 mm to about 50 mm, from about 1 mm to about 25 mm, from about 5 mm to about 35 mm, or from about 10 mm to about 50 mm, less than or equal to about 50 mm, 40 mm, 35 mm, 30 mm, 20 mm, or 10 mm, and/or greater than or equal to about 1 mm, 2 mm, 3 mm, 4 mm, 5 mm, 6 mm, 7 mm, 8 mm, 9 mm, or 10 mm.

Water passes from one side of coated substrate 40 to another, generally from the coated side to the (e.g., porous) substrate side. For example, as depicted in FIG. 1A and FIG. 1B, coated substrate 40 is configured for passage of water from an outside 44 to an inside 43 thereof, as illustrated by arrow A1. Alternatively, a substrate having a cylindrical tube shape is coated on an inside thereof with the hydrophilic and oleophobic coating 41, and water is introduced into the inside 43 of coated substrate 40 and passes from inside 43 to outside 44 (e.g., in a direction opposite that indicated by arrow A1).

As noted hereinabove, the coating of this disclosure is hydrophilic and oleophobic. In embodiments, the hydrophilic and oleophobic coating 41 includes graphene oxide. The natural tendency is for water to migrate through the hydrophilic and oleophobic coated substrate 40 (e.g., a graphene oxide coated membrane) with little or no differential pressure applied to the coated substrate 40 itself. Without limitation, such a graphene coated membrane technology is offered by G2O Water Technologies, Ltd., of Manchester UK. In embodiments, the contacting of the contaminated aqueous fluid with the coated substrate is effected at a differential pressure across the coated substrate 40 of less than or equal to about 10, 9, 8, 7, 6, or 5 psi.

According to this disclosure, the contaminated aqueous fluid which is purified by contact with the coated substrate(s) 40 can include a contaminated aqueous fluid (e.g., including water and one or more contaminants) recovered from a formation before, during, and/or after a hydraulic fracturing operation. For example, in embodiments, the contaminated aqueous fluid includes a spent hydraulic fracturing (or "fracking") fluid including, as contaminants, various wellbore fluids and solids. In embodiments, at least a portion of the treated water is utilized as a component of a hydraulic fracturing fluid.

Figure 2:
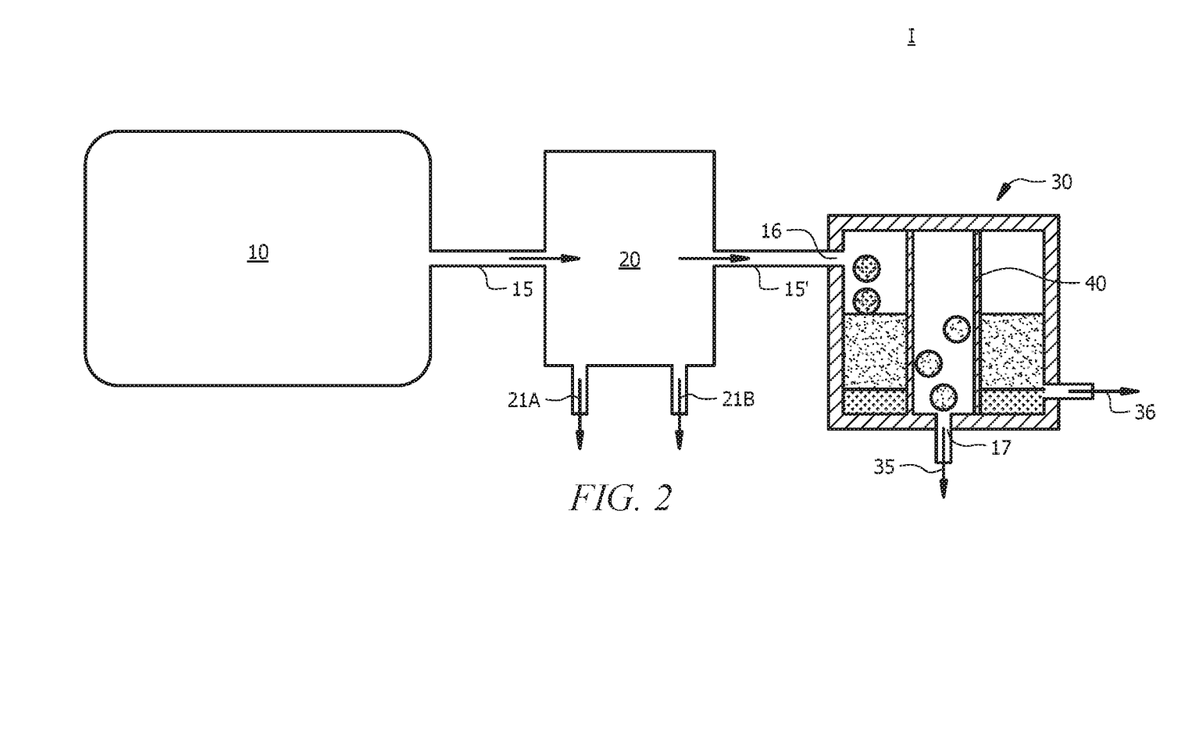
FIG. 2 is a schematic of a system I for removing contaminants from a contaminated aqueous fluid, according to embodiments of this disclosure.

As depicted in FIG. 2, which is a schematic of a system I for removing one or more contaminants from a contaminated aqueous stream (also referred to as a system for purifying water), according to embodiments of this disclosure, a water purification system of this disclosure can include a source of the contaminated aqueous fluid 10, and a water purification unit 30 including an inlet 16, an outlet 17, and at least one coated porous substrate 40 including a porous substrate (42, FIG. 1A) coated with the hydrophilic and oleophobic coating (41, FIG. 1A), and can optionally further include a pretreatment apparatus 20. Source of contaminated aqueous fluid 10 is in fluid communication with the inlet 16 of the water purification unit 30 such that a contaminated aqueous stream can be introduced into the water purification apparatus 30 from the source of the contaminated aqueous fluid 10 via the inlet 16. Within water purification apparatus 30, the contaminated aqueous fluid contacts the coated porous substrate(s) 40, and water passes through the coated porous substrate(s) 40 to provide a treated or "purified" water. The treated water that is removed from the water purification apparatus 30 via the outlet 17 has a level of the one or more contaminants that is less than the level of the one or more contaminants in the contaminated aqueous stream introduced into water purification unit 30.

In embodiments, a water purification system I does not include a pretreatment apparatus 20. In such embodiments, a contaminated aqueous fluid line 15 can fluidly connect source of contaminated aqueous fluid 10 with water purification unit 30, such that contaminated aqueous fluid can be introduced directly from the source of the contaminated aqueous fluid 10 into water purification unit 30.

In embodiments including pretreatment apparatus 20, contaminated aqueous fluid line 15 can fluidly connect source of contaminated aqueous fluid 10 with pretreatment apparatus 20, such that contaminated aqueous fluid can be introduced directly from the source of contaminated aqueous fluid 10 into pretreatment apparatus 20. In such embodiments, the contaminated aqueous fluid from contaminated aqueous fluid source 10 is pretreated in pretreatment apparatus 20 prior to contacting the contaminated aqueous fluid with the coated porous substrate(s) 40 in water purification apparatus 30 to provide the treated water. Pretreating can be utilized to remove from the contaminated aqueous stream and/or reduce the concentration in the contaminated aqueous stream of one or more non-water components. For example, when the contaminated aqueous fluid from contaminated aqueous fluid source 10 includes substantial amounts of solids and/or oils, pretreating may be utilized to reduce the levels of such solids and/or oils to a desired level prior to introducing the pretreated contaminated aqueous fluid into water purification apparatus 30. The "non-water" components removed via pretreatment in pretreatment apparatus 20 can include the same or different contaminants from those removed via water purification apparatus 30. For example, pretreatment apparatus 20 can remove larger sizes and/or amounts (e.g., volumes) of various contaminants from the contaminated aqueous stream to provide a pretreated contaminated aqueous stream that includes none or a reduced amount of such non-water components relative to an amount thereof in the contaminated aqueous fluid introduced into pretreatment apparatus 20 via contaminated aqueous fluid line 15. In embodiments, the one or more non-water components removed via pretreatment apparatus 20 (and/or the one or more contaminants removed via water purification apparatus 30) include one or more oils, one or more solids, one or more gelling or crosslinking agents, one or more polymers, or a combination thereof.

Pretreatment apparatus 20 can be any apparatus operable to remove one or more contaminants from the contaminated aqueous fluid from contaminated aqueous fluid source 10 prior to introduction thereof into water purification apparatus 30. In some embodiments, water purification apparatus 30 can be considered a final purification stage utilized to provide a "polishing" step. In embodiments, pretreating includes subjecting the contaminated aqueous fluid to: centrifugation, filtering, dissolved air flotation (DAF), exposure to ultraviolet light, electrophoresis, contact with an oxidizer, contact with an enzyme, contact with a gel breaker, contact with an acid, or a combination thereof. In embodiments, pretreatment apparatus 20 removes solids above 1000, 2000, 3000, 4000, 5000, 1000, 15000, or 20000 nm. In embodiments, pretreatment apparatus 20 removes oils to a level below about 5000, 10000, 15000, 20000, 25000, 30000, 40000, or 50000 ppm.

One or more non-water component removal lines, such as first non-water component (e.g., solids) removal line 21A and second non-water component (or oils) removal line 21B can be operable for the removal of non-water components (or "contaminants") from pretreatment apparatus 20. A pretreated contaminated aqueous fluid line 15' can fluidly connect pretreatment apparatus 20 with water purification apparatus 30 (e.g., via inlet 16 thereof), whereby the contaminated water pretreated in pretreatment apparatus 20 can be introduced into water purification apparatus 30.

In embodiments, the contaminated aqueous fluid introduced into water purification apparatus 30 (e.g., the contaminated aqueous fluid in contaminated aqueous fluid line 15 or the pretreated contaminated aqueous fluid in pretreated contaminated aqueous fluid line 15') includes solid(s) contaminant at a level of less than or equal to 15%, 10%, 9%, 8%, 7%, 6%, 5%, 4%, 3%, 2%, or 1%. In embodiments, the contaminated aqueous fluid introduced into water purification apparatus 30 (e.g., the contaminated aqueous fluid in contaminated aqueous fluid line 15 or the pretreated contaminated aqueous fluid in pretreated contaminated aqueous fluid line 15') includes oil contaminant(s) at a level of less than or equal to 5000, 10000, 15000, 25000, 30000, 40000, or 50000 ppm.

As noted hereinabove, water purification apparatus 30 contains therein the coated substrate(s) 40 (e.g., graphene oxide coated membrane(s)). In embodiments, a pump can be utilized to pump the contaminated aqueous fluid (e.g., from contaminated aqueous fluid source 10 and/or pretreatment apparatus 20) into water purification apparatus 30. Within water purification apparatus 30, the contaminated aqueous fluid (e.g., the contaminated aqueous fluid in contaminated aqueous fluid line 15 and/or pretreated aqueous fluid line 15') is contacted with the coated substrate(s) 40, and water passes through the coated substrate(s) 40 (from a coating 41 side thereof to a substrate 42 side thereof), to provide a treated water. The water removed via passage through the coated substrate 40 can be removed from water purification apparatus 30 via one or more purified or 'treated' water outlet line(s) 35, and removed contaminant(s) (e.g., contaminants introduced into water purification apparatus 30 via contaminated aqueous fluid line 15 and/or pretreated contaminated aqueous fluid line 15' that do not pass through coated substrate 40) can be removed from water purification apparatus 30 via one or more contaminant removal lines 36.

In embodiments, the treated water removed from the contaminated aqueous fluid by the contacting thereof with the coated substrate(s) 40 within water purification apparatus 30 and passage through the porous substrate 42 coated with the hydrophilic and oleophobic coating 41 is potable water. In embodiments, the treated water via purified water outlet line(s) 35 is potable water. In embodiments, the potable water has a total dissolved solids (TDS) content of less than or equal to about 5000, 4000, 3000, 2000, 1000, 750, or 500 ppm, a hydrocarbon content of less than or equal to about 500, 400, 300, 200, 100, 90, 80, 70, 60, 50, 40, 30, 20, or 10 mg/L, and/or a salt content of less than or equal to about 5000, 4000, 3000, 2000, 1000, 900, 800, 700, 600, 500, 400, 300, 200, or 100 ppm. In embodiments, the TDS is determined by water evaporation using a precision analytical balance. In embodiments, the TDS is estimated via a TDS meter that estimates the TDS from the electrical conductivity. In embodiments, the hydrocarbon content of the treated water removed via purified water outlet line(s) 35 is determined by 40 CFR Part 136 Method 608.3, 624.1, and/or 625.1. In embodiments, the conductivity is determined by measuring the electrical conductivity. In embodiments, the treated water has an oil in water content (also referred to as an amount of total petroleum hydrocarbons (TPH) present) of less than about 5000, 4000, 3000, 2000, 1000, 500, 100, 50, 10, or 1 ppm. In an aspect, the treated water meets zero discharge limits for hydrocarbon (e.g., O&G or TPH) contaminants, for example as defined in regulations (e.g., U.S. and/or state environmental discharge/disposal regulations) governing the operation of hydraulic fracturing operations in the United States.

The ability of the herein disclosed system and method to produce potable water from contaminated aqueous fluids can provide advantages over conventional water purification techniques utilized in hydraulic fracturing operations. For example, the conventional method of filtering to remove water generally allows salts, some degree of hydrocarbons, dissolved solids and the like to pass through the filter along with the removed water. Such filtered water is generally not potable, and can be hazardous, thus presenting challenges for disposal thereof. Via the herein disclosed systems and methods, an amount of hazardous waste material (e.g., hazardous water and/or solid or semi-solid waste removed via one or more non-water component outlet lines 21A/21B and/or contaminant removal lines 36) can be reduced relative to conventional systems and methods of removing contaminants from contaminated aqueous fluids encountered during hydraulic fracturing operations. Additionally, conventional filtration generally utilizes higher pressures than the herein disclosed systems and methods to separate contaminants from a contaminated aqueous fluid.

As depicted in the embodiment of FIG. 2, the contaminated aqueous fluid introduced into pretreatment apparatus 20 via contaminated aqueous fluid line 15 or water purification apparatus 30 via pretreated contaminated aqueous fluid line 15' can be introduced from contaminated aqueous fluid source 10. In embodiments, contaminated aqueous fluid source 10 includes or is a storage vessel. In embodiments, contaminated aqueous fluid source 10 includes or is a wellbore in a formation. For example, in embodiments, the contaminated aqueous fluid is a contaminated aqueous fluid recovered from a formation before, during, and/or after a hydraulic fracturing operation. In such embodiments, a method of this disclosure can further include recovering the contaminated aqueous fluid including water and one or more contaminants from the formation before, during, and/or after the hydraulic fracturing operation. For example, in embodiments, a method of this disclosure further includes combining an aqueous fluid with a gelling agent, a friction reducer (FR), and/or a proppant to provide a hydraulic fracturing fluid, pumping at least a portion of the hydraulic fracturing fluid into the formation via the wellbore as part of the hydraulic fracturing process wherein one or more fractures in the subterranean formation are formed, propagated, and/or propped open with the hydraulic fracturing fluid, and recovering the contaminated aqueous fluid including water and one or more contaminants from the or another wellbore. In such embodiments, the contaminated aqueous fluid can include at least a portion of the aqueous fluid and/or the aqueous fluid can include at least a portion of the treated water.

In embodiments, a method of this disclosure includes utilizing at least a portion of the treated water in treated water outlet line(s) 35 obtained via water purification apparatus 30 as a component of a hydraulic fracturing fluid. In such embodiments, utilizing the at least the portion of the treated water as the component of the hydraulic fracturing fluid can further include combining the at least the portion of the treated water with a gelling agent, a friction reducer (FR), and/or a proppant to produce a hydraulic fracturing fluid. Such methods can further include pumping at least a portion of the hydraulic fracturing fluid into a formation via a wellbore as part of a hydraulic fracturing process. A recovered aqueous fluid can be recovered from the or another wellbore, wherein the recovered aqueous fluid includes at least a portion of the hydraulic fracturing fluid, and the contaminated aqueous fluid can include at least a portion of the recovered aqueous fluid. That is, in embodiments, the treated water can be produced from a contaminated aqueous fluid recovered before, during, or after a hydraulic fracturing operation and/or the treated water can be utilized to produce a hydraulic fracturing fluid that can subsequently be utilized in a hydraulic fracturing operation.

Figure 3:
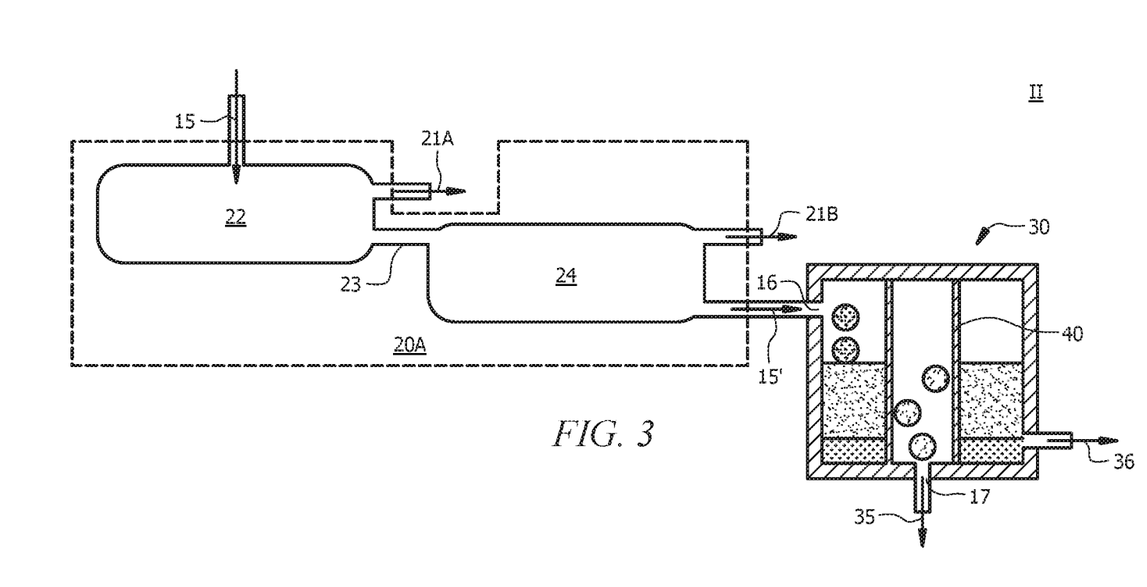
FIG. 3 is a schematic of another system II for removing contaminants from a contaminated aqueous fluid, according to embodiments of this disclosure.

FIG. 3 is a schematic of another system II for purifying a contaminated aqueous fluid, according to embodiments of this disclosure. In the embodiment of FIG. 3, pretreatment apparatus 20A includes a centrifuge 22 and filter 24. Pretreatment apparatus 20A is operable to remove one or more non-water components from contaminated aqueous fluid introduced thereto via contaminated aqueous fluid line 15 to provide pretreated contaminated aqueous fluid that can be removed from pretreatment apparatus 20 via pretreated contaminated aqueous fluid line 15'. Contaminated aqueous fluid line 15 introduces contaminated aqueous fluid (e.g., from contaminated aqueous fluid source 10 of FIG. 2) into centrifuge 22. Centrifuge 22 is operable to remove one or more non-water components from the contaminated aqueous fluid introduced thereto. One or more non-water component removal lines 21A are fluidly connected with centrifuge 22 for the removal of the removed one or more non-water components therefrom. For example, a non-water component removal line 21A can be fluidly connected with centrifuge 22 for the removal therefrom of a first non-water component(s) separated from the contaminated aqueous stream in pretreatment apparatus 20A. A centrifuge outlet line 23 can fluidly connect centrifuge 22 with filter 24, whereby the contaminated aqueous stream from which the first non-water component(s) has been removed in centrifuge 22 can be introduced into filter 24. The contaminated water introduced into filter 24 can include a reduced amount or concentration of oils and/or solids than the contaminated aqueous fluid introduced into centrifuge 22 via contaminated aqueous fluid line 15. One or more non-water component removal lines 21B can be fluidly connected with filter 24, whereby one or more second non-water components removed from the contaminated water via filter 24 can be removed from filter 24. The pretreated contaminated aqueous fluid introduced into water purification apparatus 30 via pretreated contaminated aqueous fluid line 15' can include a reduced amount or concentration of oils and/or solids than the contaminated aqueous fluid introduced into filter 24 via centrifuge outlet line 23. Pretreated contaminated aqueous fluid line 15' can fluidly connect filter 24 with water purification apparatus 30, such that pretreated contaminated water (e.g., pretreated contaminated aqueous fluid in pretreated contaminated fluid line 15') produced in pretreatment apparatus 20A can be introduced into water purification apparatus 30.

Although FIG. 3 has provided one configuration (20A) of pretreatment apparatus 20 (FIG. 1), a variety of pretreatment apparatus operable to reduce a level of and/or remove one or more non-water components from a contaminated aqueous fluid introduced thereto via a variety of technologies can be utilized and are within the scope of this disclosure.

Figure 4:
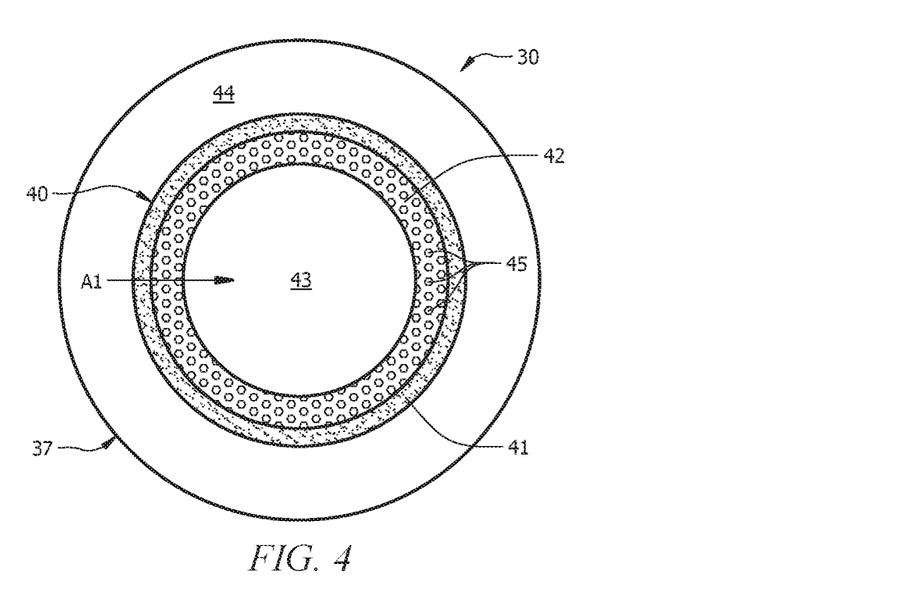
FIG. 4 is a schematic cross section view of a water purification apparatus 30 according to embodiments of this disclosure.

Water purification apparatus 30 can have a variety of configurations, so long as purified/treated water can be removed therefrom via contacting of the contaminated aqueous fluid introduced thereto (e.g., via contaminated aqueous fluid line 15 and/or pretreated contaminated aqueous fluid line 15') with a coated substrate(s) 40, as described herein. For example, in embodiments, system I of FIG. 2 or system II of FIG. 3 includes a water purification apparatus 30 as depicted in FIG. 4, which is a schematic of a water purification apparatus 30 according to embodiments of this disclosure. Water purification apparatus 30 of FIG. 4 includes a coated substrate 40 having a cylindrical or tube shaped porous substrate 42 coated with hydrophilic and oleophobic coating 41. In the embodiment of FIG. 4, porous cylindrical substrate 42 is coated on an outside thereof with the coating 41. In this embodiment, coated cylindrical substrate 40 defines an inside 43 or "treated water flow section" 43 inside cylindrical porous substrate 42, and an outside 44 or "contaminated aqueous fluid flow section" 44 between coating 41 and wall (e.g., outer wall) 37. The outer wall 37 and the coated substrate 40 can, in such embodiments, include concentric tubes or cylinders defining outside 44 of coated substrate tube 40 and inside 43 of coated substrate tube 40. In this embodiment, hydrophilic and oleophobic coating 41 of coated substrate tube 40 attracts water from contaminated aqueous fluid introduced into the contaminated aqueous fluid flow section or outside 44 (e.g., via an inlet line connected therewith, which can, in embodiments, be contaminated aqueous fluid line 15 or pretreated contaminated aqueous fluid line 15'), which water passes through cylindrical coated substrate 40 to the inside 43 of cylindrical coated substrate 40 which serves, in this arrangement, as a removed or 'treated' water flow section 43. Accordingly, in the embodiment of FIG. 4, water flows from outside 44 to inside 43 of cylindrical coated substrate 40 in the direction indicated by arrow A1. In such embodiments, an contaminated aqueous fluid inlet line(s) (e.g., contaminated aqueous fluid line 15 or pretreated contaminated aqueous fluid line 15') can be fluidly connected with and introduce contaminated aqueous fluid into outside 44 of coated substrate 40, while a treated or 'purified' water outlet line(s) 35 can be fluidly connected with and remove treated water from inside 44 of coated substrate 40.

In alternative embodiments, the hydrophilic and oleophobic coating 41 of a cylindrical coated substrate 40 is coated on the inside surface of porous substrate 42, in which embodiments, inside(s) 43 of cylindrical coated substrate(s) 40 can provide the contaminated aqueous fluid flow section(s) 26, and outside(s) 44 of cylindrical coated substrate(s) 40 can provide the removed or 'treated' water flow section(s) 27. In such embodiments, water from the contaminated aqueous fluid introduced into inside 43 (e.g., via an inlet line connected therewith, which can, in embodiments, be a contaminated aqueous fluid line 15 or pretreated contaminated aqueous fluid line 15')) can flow from inside 43 to outside 44, in a direction opposite to that indicated by arrow A1 in FIG. 4. In such embodiments, a contaminated aqueous fluid line (e.g., contaminated aqueous fluid line 15 or pretreated contaminated aqueous fluid line 15') can be fluidly connected with and introduce contaminated aqueous fluid into inside(s) 43 of coated substrate(s) 40, while a treated water outlet line(s) 35 can be fluidly connected with and remove treated water from outside(s) 44 of coated substrate(s) 40. In embodiments, a water purification apparatus 30 of this disclosure includes a plurality of cylindrical coated substrates 40, with associated contaminated aqueous fluid (inlet) lines (e.g., contaminated aqueous fluid lines 15 or pretreated contaminated aqueous fluid lines 15'), treated water outlet lines 35, and insides 43 and outsides 44 (which can provide contaminated aqueous fluid flow sections 26 and/or removed/treated water flow sections 27).

Figure 5A:
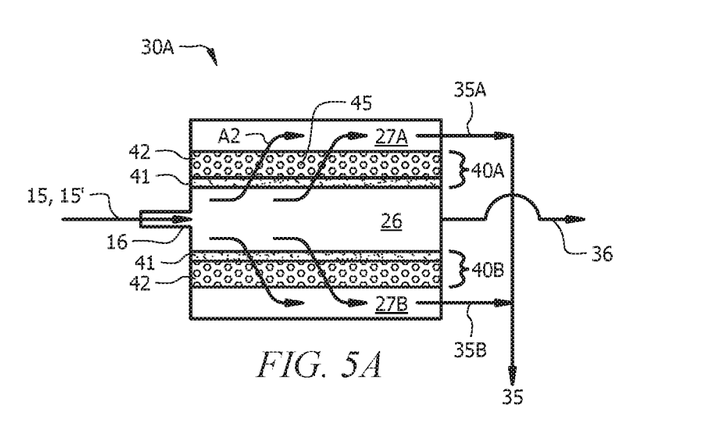
FIG. 5A is a schematic of a water purification apparatus 30A, according to embodiments of this disclosure.
Figure 5B:
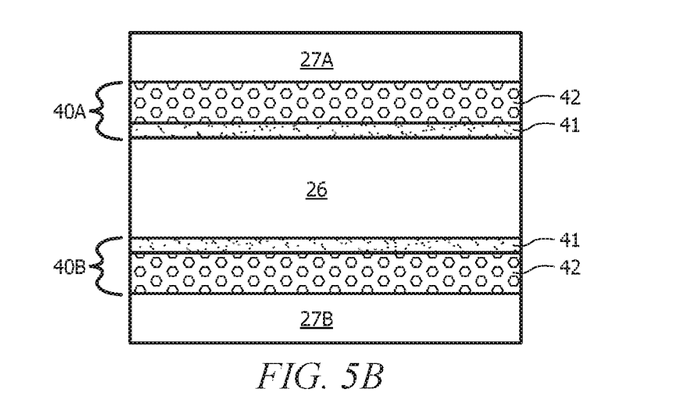
FIG. 5B is a front cross section view of the water purification apparatus 30A of FIG. 5A.

FIG. 5A is a schematic of a water purification apparatus 30A, according to embodiments of this disclosure. Water purification apparatus 30A (shown in side view cross section in FIG. 5A) can have one or more layers or "beds" of coated substrate, with two layers of coated substrate 40, first coated substrate layer 40A and second coated substrate layer 40B, depicted in the embodiment of FIG. 5A. In such embodiments, contaminated aqueous fluid can be introduced (e.g., from contaminated aqueous fluid source 10, contaminated aqueous fluid line 15 and optionally pretreatment apparatus 20 and pretreated contaminated aqueous fluid line 15') into one or more contaminated aqueous fluid flow sections 26 of water purification apparatus 30, and water that passes from the contaminated aqueous fluid, through the coated substrate layers 40A, 40B can be removed via one or more treated water flow sections 27. The contaminated aqueous fluid flow sections 26 provide contact of the contaminated aqueous fluid introduced into water purification apparatus 30 with the coating 41 of first coated substrate layer 40A and second coated substrate layer 40B. The removed water sections 27 provide a flow path for treated water that passes through first coated substrate layer 40A and second coated substrate layer 40B, on a side of substrate 42 opposite the coating 41. A water purification apparatus 30/30A/30B of this disclosure can include any number of contaminated aqueous fluid flow sections 26 and treated water flow sections 27. One contaminated aqueous fluid flow section 26 and two treated water flow sections, including first treated water flow section 27A and second treated water flow section 27B, are depicted in the embodiment of FIG. 5A. FIG. 5B shows a front view cross section of the water purification apparatus 30 of FIG. 5A. A water purification apparatus 30/30A/30B can include any number of coated substrates 40 (e.g., coated substrate layers, such as first coated substrate layer 40A and second coated substrate layer 40B of the embodiment of FIGS. 5A and 5B), contaminated aqueous fluid flow sections 26 (e.g., with a single contaminated aqueous fluid flow section 26 depicted in the embodiment of FIG. 5A and FIG. 5B), and treated water flow sections 27 (e.g., with two treated water flow sections, first treated water flow section 27A and second treated water flow section 27B depicted in the embodiment of FIG. 5A and FIG. 5B).

Figure 6A:
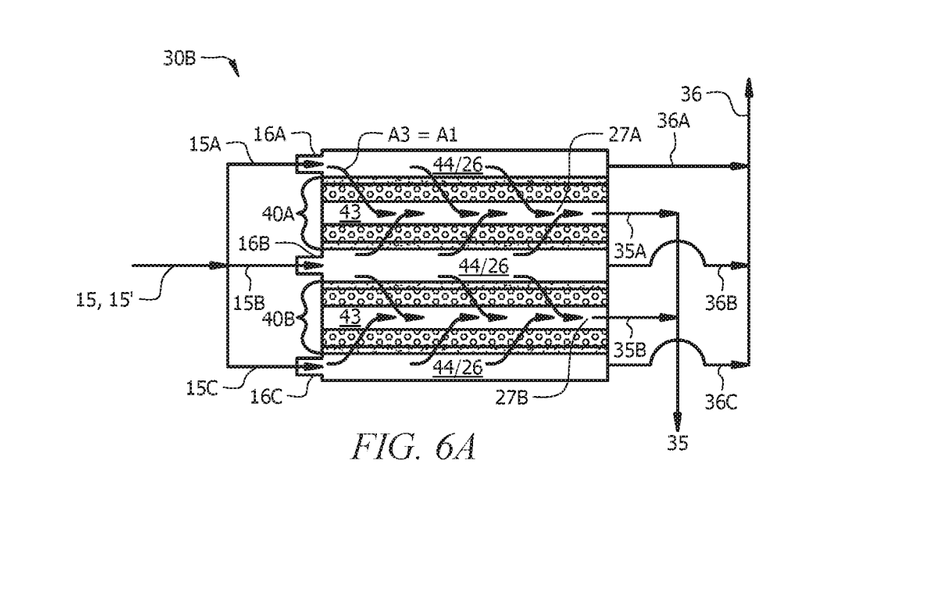
FIG. 6A is a schematic of a water purification apparatus 30B, according to embodiments of this disclosure.
Figure 6B:
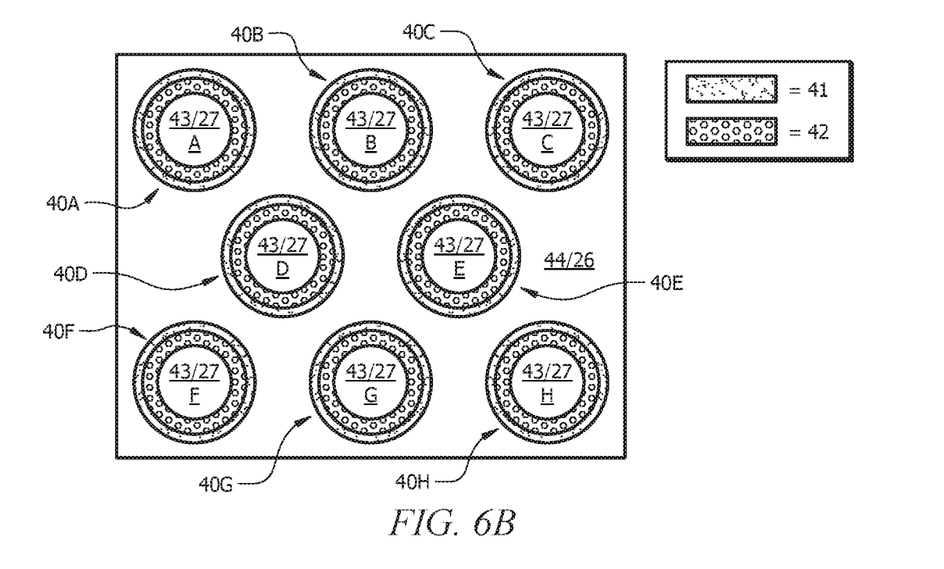
FIG. 6B is a front cross section view of a water purification apparatus 30B of FIG. 6A.

FIG. 6A is a schematic of another water purification apparatus 30B, according to embodiments of this disclosure. FIG. 6B is a front cross section view of a water purification apparatus 30B of the embodiment of FIG. 6A including eight coated substrates 40A-40H with associated insides 43 providing water flow sections 27A-27H and outsides 44 providing water flow section 26. Water purification apparatus 30B (shown in side view cross section in FIG. 6A) can include one or more cylindrical tubes (e.g., cylinders) of coated substrate (e.g., cylindrical coated membranes), with two, first cylindrical coated substrate 40A and second cylindrical coated substrate 40B shown in FIG. 7A and eight, including first through eighth cylindrical coated substrates 40A-40H shown in FIG. 6B. In this embodiment, contaminated aqueous fluid can be introduced (e.g., from contaminated aqueous fluid source 10, contaminated aqueous fluid line 15, pretreatment apparatus 20, and/or or pretreated contaminated aqueous fluid line 15') into one or more contaminated aqueous fluid flow sections 26 of water purification apparatus 30B and water that passes from the contaminated aqueous fluid, through the coating 41 and substrate 42 of first cylindrical coated substrate 40A and water that passes from the contaminated aqueous fluid through the coating 41 and substrate 42 of second cylindrical coated substrate 40B, and so on, can be removed via one or more treated water flow sections 27. Two treated water flow sections, first treated water flow section 27A and second treated water flow section 27B, are shown in FIG. 6A and eight (e.g., water flow sections 27A-27H) shown in FIG. 6B. In this embodiment, outsides 44 of the coated substrates 40 (e.g., outsides 44 of first cylindrical coated substrate 40A, second cylindrical coated substrate 40B, and so on) provide the contaminated aqueous fluid flow sections 26 (with one continuous treated water flow section indicated in the embodiment of FIG. 6A and FIG. 6B), while insides 43 of the coated substrates 40 (e.g., insides 43 of first cylindrical coated substrate 40A, second cylindrical coated substrate 40B, and so on) provide the treated water flow sections 27 (e.g., first treated water flow section 27A inside first cylindrical coated substrate 40A, second treated water flow section 27B inside second cylindrical coated substrate 40B, and so on).

A water purification apparatus 30/30A/30B of this disclosure can include any number of coated substrates 40 (e.g., cylindrical coated substrates or coated tubes, such as first cylindrical coated substrate 40A and second cylindrical coated substrate 40B of the embodiment of FIGS. 5A and 5B), contaminated aqueous fluid flow sections 26, and treated water flow sections 27. A contaminated aqueous fluid inlet line, such as contaminated aqueous fluid line 15 or pretreated contaminated aqueous fluid line 15', can be utilized to introduce the contaminated aqueous fluid (e.g., the contaminated aqueous fluid in contaminated aqueous fluid line 15 or pretreated contaminated aqueous fluid line 15') into contaminated aqueous fluid flow section(s) 26, a treated water outlet line 35 can be utilized to remove treated water from each of the treated water flow sections 27, and one or more contaminant removal lines 36 can be utilized to remove contaminants (e.g., materials that did not pass through coated substrates 40/40A/40B/etc.) from the contaminated aqueous fluid flow section(s) 26 (e.g, at an end thereof). For example, in the embodiment of FIG. 5A and FIG. 5B, contaminated aqueous fluid line 15 or pretreated contaminated aqueous fluid line 15' can be utilized to introduce contaminated aqueous fluid into contaminated aqueous fluid flow section 26, contaminant removal line 36 can be utilized to remove contaminants from contaminated aqueous fluid flow section 26 (e.g., at an opposite end thereof from the contaminated aqueous fluid inlet 16), and first treated water outlet line 35A and second treated water outlet line 35B can be utilized to remove treated water from first treated water flow section 27A and second treated water flow section 27B, respectively. First treated water outlet line 35A and second treated water outlet line 35B can be manifolded into a single treated water outlet line 35, in embodiments.

In the embodiment of FIG. 6A and FIG. 6B, contaminated aqueous fluid line 15 or pretreated contaminated aqueous fluid line 15' is divided to provide one or more contaminated fluid inlet lines, such as first contaminated aqueous fluid line 15A, second contaminated aqueous fluid line 15B, third contaminated aqueous fluid line 15C, and so on, which can be utilized to introduce contaminated aqueous fluid (e.g., contaminated aqueous fluid from contaminated aqueous fluid line 15 or pretreated contaminated aqueous fluid line 15') into contaminated aqueous fluid flow section(s) 26. One or more contaminant removal lines, such as first contaminant removal line 36A, second contaminant removal line 36B, and third contaminant removal line 36C, can be utilized to remove contaminants from contaminated aqueous fluid flow section(s) 26 (e.g., at an opposite end thereof from the contaminated aqueous fluid inlets 16A, 16B, 16C). One or more treated water outlet lines, such as first treated water outlet line 35A, second treated water outlet line 35B, and so on, can be utilized to remove treated water from first treated water flow section 27A, second treated water flow section 27B, and so on, respectively. The contaminant removal line(s) (e.g., first contaminant removal line 36A, second contaminant removal line 36B, and third contaminant removal line 36C) can be manifolded into a single contaminant removal line 36, in embodiments. Similarly, the treated water outlet line(s) (e.g., first treated water outlet line 35A, second treated water outlet line 35B, and so on, can be manifolded into a single treated water outlet line 35, in embodiments.

One or more contaminated aqueous fluid inlet lines 15 can be utilized to introduce contaminated fluid into each contaminated aqueous fluid sections 26. One or more contaminant removal lines 36 can be utilized to remove contaminated aqueous fluid from each contaminated aqueous fluid sections 26. One or more treated water outlet lines 35 can be utilized to removed treated water from each treated water section 27.

Although contaminated aqueous fluid flow section 26 of the embodiment of FIG. 6A and FIG. 6B is shown as a continuous section in FIG. 6B (i.e., because coated substrates 40 are depicted as not touching), in embodiments, coated substrate tubes (e.g., first cylindrical coated substrate 40A, second cylindrical coated substrate 40B, etc.) can be in contact with neighboring coated substrate tubes, and a plurality of contaminated aqueous fluid inlet flow lines (e.g., first contaminated aqueous fluid line 15A, second contaminated aqueous fluid line 15B, and third contaminated aqueous fluid line 15C) can be utilized to introduce the contaminated aqueous fluid (e.g., contaminated aqueous fluid from contaminated aqueous fluid source 10 and/or pretreated contaminated aqueous fluid from pretreatment apparatus 20/20A/20B) into disparate contaminated aqueous fluid flow sections 26 of a water purification apparatus 30, in embodiments.

In the embodiment of FIG. 6A and FIG. 6B, water purification apparatus 30 is designed in a similar manner as a heat exchanger, wherein the coated substrate tubes 40 of the water purification apparatus 30 separate the flow of contaminated aqueous fluid and the treated water that passes through the coated walls (e.g., coating 41) and substrates 42 of the coated substrate tubes (e.g., coated substrates 40A-40H) the way the heat exchange tubes of a heat exchanger separate a heat exchanger fluid from a process fluid and heat passes through the walls of the heat exchanger tubes. The inside 43 and the outside 44 of the tubes act as the contaminated aqueous fluid flow sections 26 and the treated water flow sections 27, respectively, or vice versa.

A plethora of configurations of the coated substrate 40/40A/40B/etc. (e.g., layers or sheets, as depicted in the embodiments of FIGS. 5A and 5B, tubes or cylinders, as depicted in the embodiments of FIGS. 6A and 6B) are possible, and within the scope of this disclosure. For example, by way of further non-limiting example, in alternative embodiments, the porous substrate 42 includes hollow particulates, and the particulate substrate is coated with the hydrophilic and oleophobic coating 41 to provide a coated substrate 40 including coated particulates. In such embodiments, water purification apparatus 30 can include a bed, layer, or containment of such coated particulates. In such embodiments, contaminated aqueous fluid introduced into water purification apparatus 30, for example via a contaminated fluid inlet line such as contaminated aqueous fluid line 15 or pretreated contaminated aqueous fluid line 15', contacts the particulates of coated substrate 40, water passes through the hydrophilic and oleophobic coating 41 of the coated particulates, and enters a hollow core, center, or region of the particulates. In such embodiments, the coated particulates having removed water sequestered therein can be regenerated (i.e., water removed therefrom), and be reused in water purification apparatus 30. Regeneration can include heating, pressing, or the like to remove the water from the spent coated substrate particulates prior to re-use.

In embodiments, a method of this disclosure further includes cycling the coated porous substrate(s) 40/40A/40B/etc. through a backwash to clean an upstream surface thereof. Such cycling can be effected continuously, in embodiments.

In embodiments, the volume of the contaminated fluid removed from water purification apparatus 30/30A/30B via contaminant removal line(s) 36/36A/36B/36C/etc. is at least 5, 10, 20, 30, or 40 percent less than a volume of the contaminated aqueous fluid introduced into water purification apparatus 30/30A/30B (e.g., via contaminated aqueous fluid line 15 or pretreated contaminated aqueous fluid line 15'). As described hereinabove, in embodiments, the treated water produced from the contaminated aqueous fluid via the passage through the coating 41 and porous substrate 42 (of coated substrate(s) 40) is potable water. In embodiments, the volume of the contaminated fluid removed from pretreatment apparatus 20/20A via the one or more non-water component outlet lines 21A/21B and/or removed from water purification apparatus 30/30A/30B via the one or more contaminant removal line(s) 36/36A/36B/36C/etc. is at least 5, 10, 20, 30, or 40 percent less than a volume of the contaminated aqueous fluid introduced into pretreatment apparatus 20/20A and/or water purification apparatus 30/30A/30B, respectively (e.g., via contaminated aqueous fluid line 15 or pretreated contaminated aqueous fluid line 15').

The method can further include utilizing the treated water that is removed from the contaminated aqueous fluid via the passage through the coated substrate(s) 40/40A/40B/etc. (e.g., and removed from water purification apparatus 30 via treated water outlet line(s) 35) onsite, disposing of at least a portion of the treated water onsite or offsite, or a combination thereof. In embodiments, utilizing and/or the disposing are effected without further treatment of the treated water for the removal of one or more (e.g., additional amounts and/or types of) contaminants (or "non-water" components) therefrom. In embodiments, the treated water is utilized onsite or offsite as drinking water, wash water, irrigation water, cooling water, a component of an aqueous containing wellbore servicing fluid (e.g., an aqueous based or oil based wellbore servicing fluid), or a combination thereof. In embodiments, utilizing the at least the portion of the treated water onsite further includes utilizing the at least the portion of the treated water onsite as a component of a wellbore servicing fluid, a component of a chemical process fluid, as drinking water, or a combination thereof. In embodiments, at least a portion of the treated water is utilized onsite of the hydraulic fracturing operation. In embodiments, utilizing the at least the portion of the treated water onsite further includes utilizing the at least the portion of the treated water onsite as a component of a hydraulic fracturing fluid, as a component of another wellbore servicing fluid, as drinking water, or a combination thereof. Utilizing the at least the portion of the treated water as a component of a hydraulic fracturing fluid can further include combining the at least the portion of the treated water with a gelling agent, a friction reducer (FR), a proppant, or a combination thereof to produce the hydraulic fracturing fluid and pumping the hydraulic fracturing fluid down a wellbore and into the subterranean formation penetrated by the wellbore to initiate, propagate, and/or prop open one or more hydraulic factures in the subterranean formation to enhance production of O&G from the subterranean formation.

The water treatment/purification to produce the treated water can be effected as detailed hereinabove. For example, in embodiments, the hydrophilic and oleophobic coating utilized in this method includes graphene oxide.

Those of ordinary skill in the art will readily appreciate various benefits that may be realized by the present disclosure. According to embodiments of this disclosure, contaminated aqueous fluid, such as contaminated hydraulic fracturing fluid, can be effectively treated onsite by the system and method of this disclosure to produce treated water that can be easily disposed of or reutilized onsite, leaving a significantly reduced quantity of material (e.g., the contaminants removed via the one or more non-water component removal lines 21A/21B and/or the one or more contaminant removal lines 36/36A/36B/36C/etc.) that must be disposed of and/or shipped offsite. In embodiments, the treated water can be discharged into the environment and/or reused for other hydraulic fracturing or oil field applications.

The herein disclosed system and method also enable purification of water whereby a volume of the contaminated aqueous fluid can be decreased. In embodiments, via the herein disclosed system and method, potable water can be produced from contaminated aqueous fluids, and the potable water utilized onsite (e.g., for drinking water, wash water, irrigation water, cooling water, a component of an aqueous containing wellbore servicing fluid (e.g., an aqueous based or oil based wellbore servicing fluid, a hydraulic fracturing fluid), or a combination thereof) and/or sent off site. In embodiments, the removal of contaminants from contaminated aqueous fluids as per this disclosure can result in a reduced amount of hazardous or un-environmentally friendly materials (liquid and/or solid or semi-solid contaminants) for which permits and/or further treatment are required for disposal. In embodiments, a graphene oxide coated membrane is utilized to reduce a hydrocarbon content of the contaminated aqueous fluid to a point that the resulting treated water is potable and/or suitable for discharge with even stringent discharge regulations. The system and method of this disclosure can minimize environmental risks for hydraulic fracturing operations and permit the reuse of the treated water.

Utilization of a coated substrate(s) (e.g., a coated substrate(s) 40/40A/40B/etc.) including a hydrophilic and oleophobic coating 41 (e.g., a graphene oxide coating) may provide an advantage over standard membrane technologies utilized for removing contaminants from spent hydraulic fracturing fluids (e.g., hydraulic fracturing fluids contaminated with various wellbore fluids and solids) due to the hydrophilic and oleophobic nature of the herein disclosed coating 41. Via the system and method of this disclosure, graphene oxide coated membranes can be utilized to treat such spent fracking water so that it can be discharged, for example, into the environment.

ADDITIONAL DISCLOSURE

The following are non-limiting, specific embodiments in accordance with the present disclosure:

Embodiment A

A method comprising: contacting a contaminated aqueous fluid comprising water and one or more contaminants with a coated porous substrate comprising a porous substrate coated with a hydrophilic and oleophobic coating to produce a treated water comprising water that passes through the coated porous substrate, wherein a level of the one or more contaminants in the treated water is less than the level of the one or more contaminants in the contaminated aqueous fluid; and utilizing at least a portion of the treated water as a component of a hydraulic fracturing fluid.

Embodiment B

A method comprising: combining an aqueous fluid with a gelling agent, a friction reducer (FR), and/or a proppant to provide a hydraulic fracturing fluid; pumping at least a portion of the hydraulic fracturing fluid into a subterranean formation via a wellbore as part of a hydraulic fracturing process, wherein one or more fractures in the subterranean formation are formed, propagated, and/or propped open with the hydraulic fracturing fluid; recovering a contaminated aqueous fluid comprising water and one or more contaminants from the or another wellbore, wherein the contaminated aqueous fluid comprises at least a portion of the aqueous fluid; and contacting the contaminated aqueous fluid with a coated porous substrate comprising a porous substrate coated with a hydrophilic and oleophobic coating to produce a treated water comprising water that passes through the coated porous substrate, wherein a level of the one or more contaminants in the treated water is less than the level of the one or more contaminants in the contaminated aqueous fluid.

Embodiment C

A method comprising: recovering a contaminated aqueous fluid comprising water and one or more contaminants from a formation before, during, and/or after a hydraulic fracturing operation; contacting the contaminated aqueous fluid with a coated porous substrate comprising a porous substrate coated with a hydrophilic and oleophobic coating to produce a treated water comprising water that passes through the coated porous substrate, wherein a level of the one or more contaminants in the treated water is less than the level of the one or more contaminants in the contaminated aqueous fluid; and disposing of at least a portion of the treated water.

Embodiment D

The method of any of Embodiment A to Embodiment C, wherein the hydrophilic and oleophobic coating comprises graphene oxide.

Embodiment E

The method of any of Embodiment A to Embodiment D, wherein the porous substrate comprises a membrane, a particulate, a tube, or a combination thereof.

Embodiment F

The method of any of any of Embodiment A to Embodiment E, wherein the porous substrate comprises a polymer, a ceramic, a zeolite, a molecular sieve, or a combination thereof.

Embodiment G

The method of any of any of Embodiment A to Embodiment F, wherein the contacting is effected at a differential pressure across the coated porous substrate of less than or equal to about 10, 7, or 5 psi.

Embodiment H

The method of any of any of Embodiment A to Embodiment G, wherein the treated water is potable water.

Embodiment I

The method of Embodiment H wherein the potable water comprises a total dissolved solids (TDS) content, as measured by conductivity and/or water evaporation, of less than or equal to about 5000, 1000, or 500 ppm, a hydrocarbon content, as measured by 40 CFR Part 136 Method 608.3, 624.1, and/or 625.1, of less than or equal to about 500, 100, or 10 mg/L, and/or a salt content, as measured by electrical conductivity, of less than or equal to about 5000, 1000, or 100 ppm.

Embodiment J

The method of any of Embodiment A to Embodiment I further comprising cycling the coated porous substrate through a backwash to clean an upstream surface thereof.

Embodiment K

The method of any of Embodiment A to Embodiment J further comprising pretreating the contaminated aqueous fluid prior to contacting the contaminated aqueous fluid with the coated porous substrate to provide the treated water, wherein pretreating removes from the contaminated aqueous fluid and/or reduces a concentration in the contaminated aqueous fluid of one or more non-water components of the contaminated aqueous fluid.

Embodiment L

The method of Embodiment K, wherein the one or more non-water components and/or the one or more contaminants comprise one or more oils, one or more solids, one or more gelling or crosslinking agents, or a combination thereof.

Embodiment M

The method of Embodiment L, wherein pretreating comprises subjecting the contaminated aqueous fluid to: centrifugation, filtering, dissolved air flotation (DAF), exposure to ultraviolet light, electrophoresis, contact with an oxidizer, contact with an enzyme, contact with a gel breaker, contact with an acid, or a combination thereof.

Embodiment N

The method of any of Embodiment A or Embodiment D to Embodiment M, wherein utilizing the at least the portion of the treated water as the component of the hydraulic fracturing fluid further comprises combining the at least the portion of the treated water with a gelling agent, a friction reducer (FR), and/or a proppant to produce the hydraulic fracturing fluid.

Embodiment O

The method of Embodiment N further comprising: pumping at least a portion of the hydraulic fracturing fluid into a formation via a wellbore as part of a hydraulic fracturing process, wherein one or more fractures in the subterranean formation are formed, propagated, and/or propped open with the hydraulic fracturing fluid.

Embodiment P

The method of Embodiment O further comprising recovering a recovered aqueous fluid from the or another wellbore, wherein the recovered aqueous fluid comprises at least a portion of the hydraulic fracturing fluid, and wherein the contaminated aqueous fluid comprises at least a portion of the recovered aqueous fluid.

Embodiment Q

The method of any of Embodiment B or Embodiment D to Embodiment M, wherein the aqueous fluid comprises at least a portion of the treated water.

Embodiment R

The method of any of Embodiment C to Embodiment M, wherein the disposing is effected without further treatment of the treated water for the removal of one or more contaminants therefrom.

Embodiment S

The method of any of Embodiment C to Embodiment M further comprising utilizing at least a portion of the treated water onsite of the hydraulic fracturing operation.

Embodiment T

The method of Embodiment S, wherein utilizing the at least the portion of the treated water onsite further comprises utilizing the at least the portion of the treated water onsite as a component of a hydraulic fracturing fluid, as a component of another wellbore servicing fluid, as drinking water, or a combination thereof.

Embodiment U

The method of Embodiment T, wherein utilizing the at least the portion of the treated water as the component of the hydraulic fracturing fluid further comprises combining the at least the portion of the treated water with a gelling agent, a friction reducer (FR), a proppant, or a combination thereof to produce the hydraulic fracturing fluid.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method comprising:
   contacting a contaminated aqueous fluid comprising a contaminant with a coated porous substrate, wherein the coated porous substrate is coated with a hydrophilic or oleophobic coating, wherein the hydrophilic or oleophobic coating comprises graphene oxide; and
   passing the aqueous fluid through the coated porous substrate to produce a treated water comprising water, wherein the treated water is potable water, and whereby the concentration of the contaminant in the treated water is less than the level of the contaminant in the contaminated aqueous fluid; and
   utilizing at least a portion of the treated water as a component of a hydraulic fracturing fluid.

2. The method of claim 1:
   wherein the coated porous substrate comprises a membrane, a particulate, a tube, or a combination thereof; and/or
   wherein the coated porous substrate comprises a polymer, a ceramic, a zeolite, a molecular sieve, or a combination thereof.

3. A method comprising:
   contacting a contaminated aqueous fluid comprising a contaminant with a coated porous substrate, wherein the coated porous substrate is coated with a hydrophilic or oleophobic coating; and
   passing the aqueous fluid through the coated porous substrate to produce a treated water comprising water, wherein the treated water is potable water, and whereby the concentration of the contaminant in the treated water is less than the level of the contaminant in the contaminated aqueous fluid; and
   utilizing at least a portion of the treated water as a component of a hydraulic fracturing fluid, wherein the contacting is effected at a differential pressure across the coated porous substrate of less than or equal to about 10 psi.

4. The method of claim 1, wherein the potable water comprises (i) a total dissolved solids (TDS) content, as measured by conductivity and/or water evaporation, of less than or equal to about 5000 ppm, (ii) a hydrocarbon content, as measured by 40 CFR Part 136 Method 608.3, 624.1, and/or 625.1, of less than or equal to about 500 mg/L, (iii) a salt content, as measured by electrical conductivity, of less than or equal to about 5000 ppm, or (iv) any combination of (i), (ii), and (iii).

5. The method of claim 1 further comprising removing at least some of a component other than water from the contaminated aqueous fluid during a pretreatment that precedes the contacting.

6. The method of claim 5, wherein the one or more non-water components and/or the contaminant is selected from the group consisting of an oil, solid, a gelling or crosslinking agent, and a combination thereof.

7. The method of claim 6, wherein pretreating comprises subjecting the contaminated aqueous fluid to: centrifugation, filtering, dissolved air flotation (DAF), exposure to ultraviolet light, electrophoresis, contact with an oxidizer, contact with an enzyme, contact with a gel breaker, contact with an acid, or a combination thereof.

8. The method of claim 1, wherein utilizing the at least the portion of the treated water as the component of the hydraulic fracturing fluid further comprises combining the at least the portion of the treated water with a gelling agent, a friction reducer (FR), and/or a proppant to produce the hydraulic fracturing fluid.

9. The method of claim 8 further comprising:
pumping at least a portion of the hydraulic fracturing fluid into a formation via a wellbore as part of a hydraulic fracturing process.

10. The method of claim 9 further comprising recovering a recovered aqueous fluid from the or another wellbore, wherein the recovered aqueous fluid comprises at least a portion of the hydraulic fracturing fluid, and wherein the contaminated aqueous fluid comprises at least a portion of the recovered aqueous fluid.

11. A method comprising:
combining an aqueous fluid with a gelling agent, a friction reducer (FR), and/or a proppant to provide a hydraulic fracturing fluid;
pumping at least a portion of the hydraulic fracturing fluid into a formation via a wellbore as part of a hydraulic fracturing process;
recovering a contaminated aqueous fluid comprising a contaminant from the or another wellbore, wherein the contaminated aqueous fluid comprises at least a portion of the aqueous fluid; and
contacting the contaminated aqueous fluid with a coated porous substrate, wherein the coated porous substrate is coated with a hydrophilic or oleophobic coating, wherein the hydrophilic or oleophobic coating comprises graphene oxide; and
passing the contaminated aqueous fluid through the coated porous substrate to produce a treated water, whereby the concentration of the contaminant in the treated water is less than the concentration of the contaminant in the contaminated aqueous fluid, and
wherein the treated water is potable water.

12. The method of claim 11, wherein the aqueous fluid comprises at least a portion of the treated water.

13. A method comprising:
recovering a contaminated aqueous fluid comprising a contaminant from a formation before, during, and/or after a hydraulic fracturing operation;
contacting the contaminated aqueous fluid with a coated porous substrate, wherein the coated with a hydrophilic or oleophobic coating, wherein the hydrophilic or oleophobic coating comprises graphene oxide; and
passing the contaminated aqueous fluid through the coated porous substrate to produce a treated water, whereby the concentration of the contaminant in the treated water is less than the concentration of the contaminant in the contaminated aqueous fluid; and
disposing of at least a portion of the treated water, wherein the treated water is potable water.

14. The method of claim 13:
wherein the disposing is effected without further treatment of the treated water for the removal of the contaminant therefrom; and/or
further comprising utilizing at least a portion of the treated water onsite of the hydraulic fracturing operation.

15. The method of claim 14, wherein utilizing the at least the portion of the treated water onsite further comprises utilizing the at least the portion of the treated water onsite as a component of a hydraulic fracturing fluid, as a component of another wellbore servicing fluid, as drinking water, or a combination thereof.

16. The method of claim 15, wherein the utilizing of the at least portion of the treated water onsite is as a component of the hydraulic fracturing fluid and further comprises combining the at least portion of the treated water with a gelling agent, a friction reducer (FR), a proppant, or a combination thereof to produce the hydraulic fracturing fluid.

17. The method of claim 11, wherein the potable water comprises (i) a total dissolved solids (TDS) content, as measured by conductivity and/or water evaporation, of less than or equal to about 5000 ppm, (ii) a hydrocarbon content, as measured by 40 CFR Part 136 Method 608.3, 624.1, and/or 625.1, of less than or equal to about 500 mg/L, (iii) a salt content, as measured by electrical conductivity, of less than or equal to about 5000 ppm, or (iv) any combination of (i), (ii), and (iii).

18. The method of claim 13, wherein the potable water comprises (i) a total dissolved solids (TDS) content, as measured by conductivity and/or water evaporation, of less than or equal to about 5000 ppm, (ii) a hydrocarbon content, as measured by 40 CFR Part 136 Method 608.3, 624.1, and/or 625.1, of less than or equal to about 500 mg/L, (iii) a salt content, as measured by electrical conductivity, of less than or equal to about 5000 ppm, or (iv) any combination of (i), (ii), and (iii).

19. The method of claim 3, wherein the potable water comprises (i) a total dissolved solids (TDS) content, as measured by conductivity and/or water evaporation, of less than or equal to about 5000 ppm, (ii) a hydrocarbon content, as measured by 40 CFR Part 136 Method 608.3, 624.1, and/or 625.1, of less than or equal to about 500 mg/L, (iii) a salt content, as measured by electrical conductivity, of less than or equal to about 5000 ppm, or (iv) any combination of (i), (ii), and (iii).

20. The method of claim 3, further comprising removing at least some of a component other than water from the contaminated aqueous fluid during a pretreatment that precedes the contacting,
wherein the one or more non-water components and/or the contaminant is selected from the group consisting of an oil, a solid, a gelling or crosslinking agent, and a combination thereof; and
wherein pretreating comprises subjecting the contaminated aqueous fluid to: centrifugation, filtering, dissolved air flotation (DAF), exposure to ultraviolet light, electrophoresis, contact with an oxidizer, contact with an enzyme, contact with a gel breaker, contact with an acid, or a combination thereof.

21. The method of claim 3, further comprising:
pumping at least a portion of the hydraulic fracturing fluid into a formation via a wellbore as part of a hydraulic fracturing process; and
recovering a recovered aqueous fluid from the or another wellbore, wherein the recovered aqueous fluid comprises at least a portion of the hydraulic fracturing fluid, and wherein the contaminated aqueous fluid comprises at least a portion of the recovered aqueous fluid.

* * * * *

UNITED STATES PATENT AND TRADEMARK OFFICE
CERTIFICATE OF CORRECTION

PATENT NO. : 10,919,781 B1
APPLICATION NO. : 16/599316
DATED : February 16, 2021
INVENTOR(S) : Dale E. Jamison and William Walter Shumway Page 1 of 1

It is certified that error appears in the above-identified patent and that said Letters Patent is hereby corrected as shown below:

In the Claims

Column 19, Claim 13, Lines 41-42, replace "wherein the coated with a hydrophilic or oleophobic coating" with --wherein the coated porous substrate is coated with a hydrophilic or oleophobic coating--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*